Oct. 31, 1961  E. W. ELLIOTT ET AL  3,006,263
FOCAL PLANE SHUTTER
Filed July 31, 1957  3 Sheets-Sheet 1
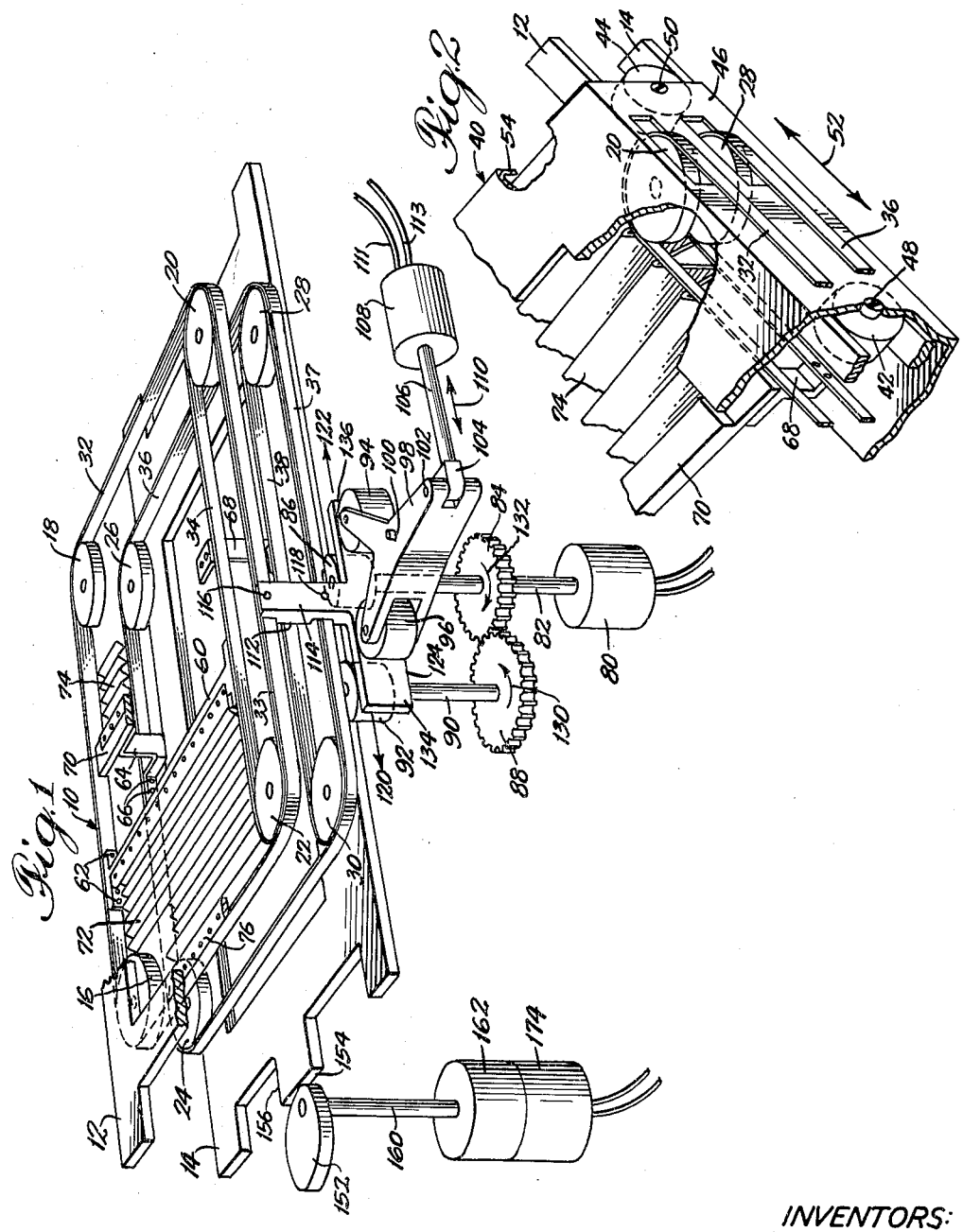
INVENTORS:
Eugene W. Elliott
and Elmer J. Bury,
BY Louis Bernar
ATTORNEY.

Oct. 31, 1961  E. W. ELLIOTT ET AL  3,006,263
FOCAL PLANE SHUTTER
Filed July 31, 1957  3 Sheets-Sheet 2
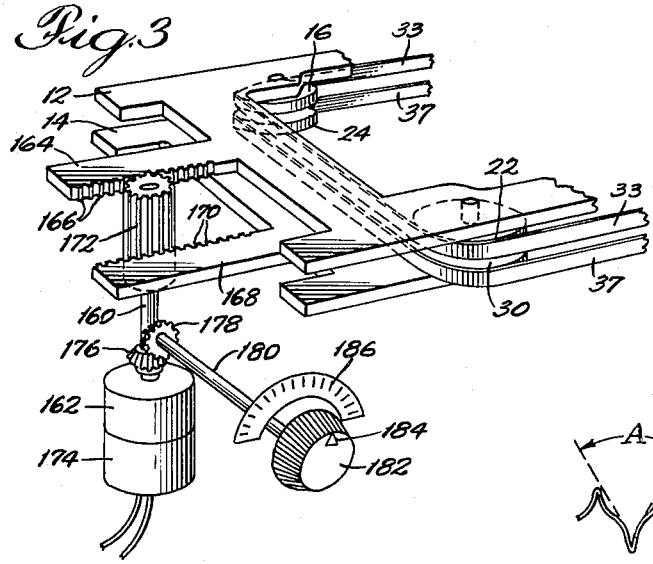
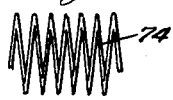
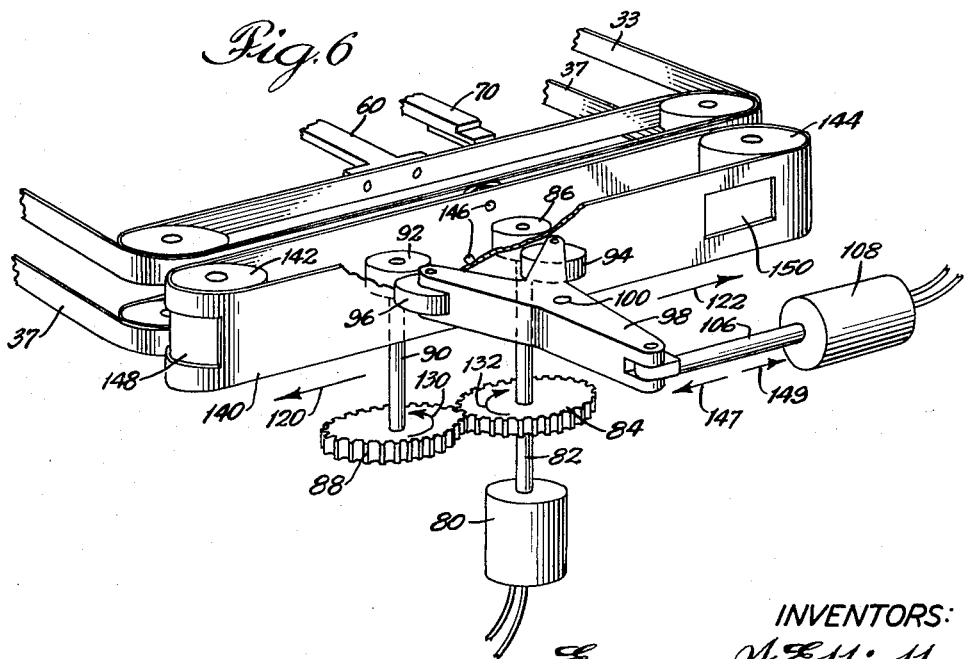
INVENTORS:
Eugene W. Elliott
and Elmer J. Bury,
BY Louis Bernar
ATTORNEY.

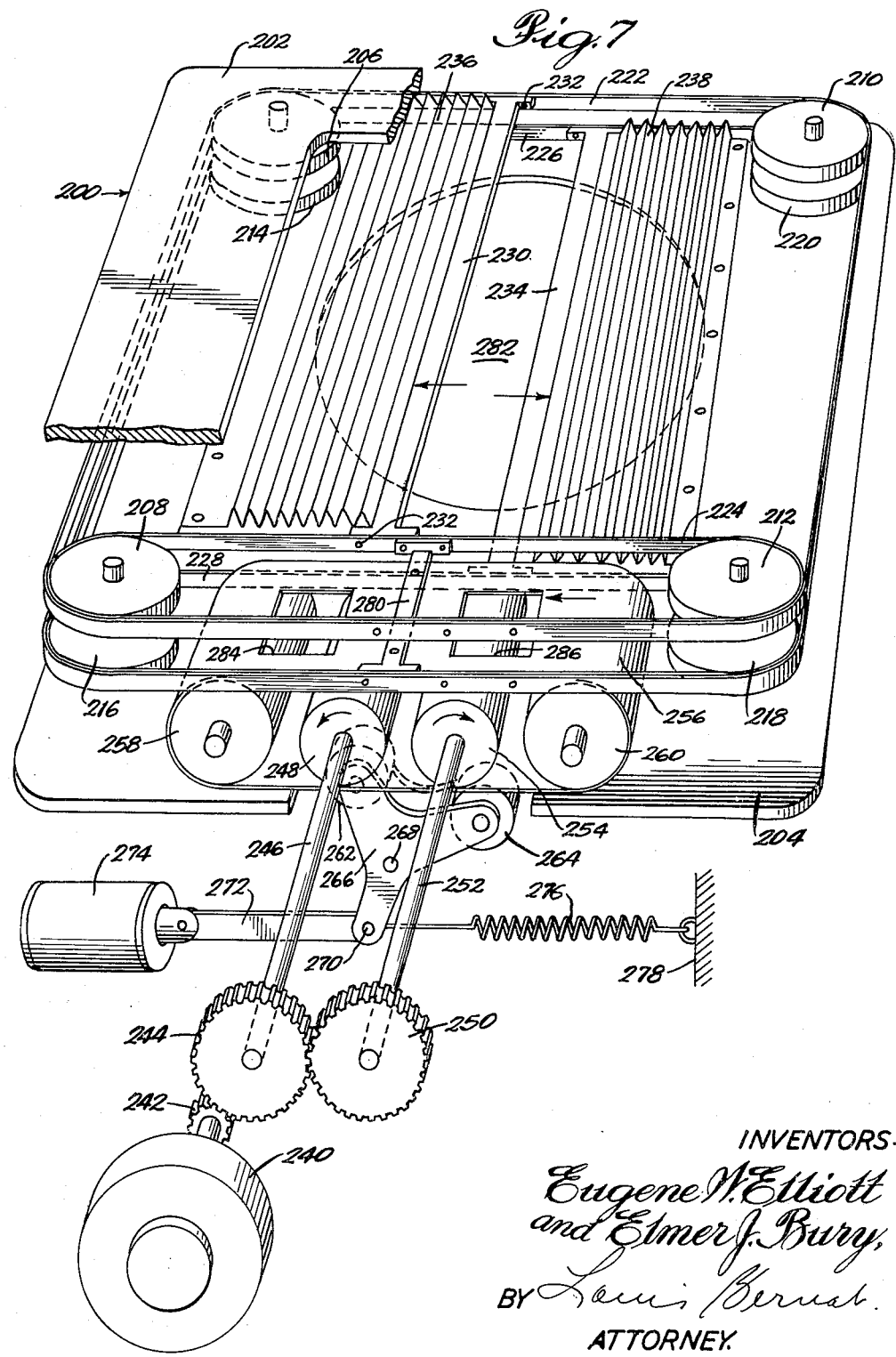

United States Patent Office 3,006,263
Patented Oct. 31, 1961

---

3,006,263
FOCAL PLANE SHUTTER
Eugene W. Elliott, Oak Park, and Elmer J. Bury, Wheaton, Ill., assignors, by mesne assignments, to Chicago Aerial Industries, Inc., Melrose Park, Ill., a corporation of Delaware
Filed July 31, 1957, Ser. No. 675,309
19 Claims. (Cl. 95—57)

This invention relates generally to focal plane shutters for cameras and more particularly to improvements in adjustable slit, high speed focal plane shutters.

It will be appreciated by those skilled in the art that existing focal plane shutters may be divided into three general types. One type is characterized by a shutter curtain having a slit of fixed width and adapted to be driven across the exposure area at different speeds to attain the various exposures desired.

A second type of focal plane shutter is characterized by a shutter curtain having a plurality of slits of different widths and being selectively operable at different exposures by choosing among the various slit widths available and by varying curtain speed. The third type of existing focal plane shutter is characterized by a pair of curtain shutters having an adjustable slit width and operable at various speeds to the end that a desired exposure is obtained by selection of a slit width and a curtain speed.

Generally all three types of focal plane shutters described above are spring driven. This imposes serious limitations on the operation of these shutters for the gradient of the spring which powers the curtain is undesirable, even at low exposure speeds. At high exposure speeds, the gradient of the spring is so undesirable that it must be compensated for to maintain the reliability of shutter calibration. It has been found that such compensation normally leads to the degradation of energy available for driving the shutter curtain.

Shutters of the first type described above, having a fixed slit width, further have the inherent disadvantage in that the range of exposure speeds is so narrow that their usefulness is seriously impaired. Shutters of the second type, those having a plurality of slits of different widths, have inherent disadvantages arising from the complex design of the curtain and the mechanism necessary to select the various widths. Further, the mechanism which selects the slit width commonly is operated against the tension of the spring which drives the curtain so that the selection of slit width becomes difficult when the operating spring is under a large amount of tension.

The third type of shutter described above, those having an adjustable slit width, also have inherent disadvantages which arise primarily from the difficulty of attaining the proper timing of travel of the two curtains defining the slit. Further, all three types of existing focal plane shutters generally use some variety of flexible curtain wound around rollers. Manifestly, this arrangement results in the shutter having an appreciable mass and hence there is considerable inertia to be overcome when the curtain is accelerated to the required velocity.

Accordingly, it is a general object of this invention to provide an improved high speed focal plane shutter.

It is another object of this invention to provide such an improved high speed focal plane shutter in which the slit may easily be adjusted to any desired width.

It is still another object of this invention to provide an improved focal plane shutter in which a pair of curtains defining a slit therebetween are adapted to be driven in synchronism by a relatively simple driving means.

It is a further object of this invention to provide such an improved focal plane shutter in which the power for driving the shutter curtains is derived from a constant speed electric motor source and which includes means for clutching the motor to the shutter to provide shutter drive in a desired direction.

It is a still further object of this invention to provide an improved focal plane shutter as described above, which is characterized by its relatively low mass and therefore low inertia characteristics.

It is another object of this invention to provide an improved high speed focal plane shutter of lightweight, sturdy and relatively simple construction which is capable of overcoming the several disadvantages of the prior art focal plane shutters as described herein above.

With these and other objects in view, the invention consists in the construction, arrangement and combination of the various parts of the novel focal plane shutter whereby the objects contemplated are attained as hereinafter more fully set forth. The various features of novelty which characterize this invention are pointed out with particularity in the claims annexed to and forming a part of this specification. For a better understanding of the invention, however, and its advantages, reference is had to the accompanying drawing and descriptive matter in which is illustrated and described several specific illustrative embodiments of the invention.

In the drawing:

FIGURE 1 is a perspective view, with parts broken away, of an illustrative focal plane shutter embodying principles of the invention;

FIGURE 2 is a perspective view of a portion of a focal plane shutter embodying the invention with parts broken away and enlarged to illustrate a preferred construction of the invention;

FIGURE 3 is a perspective view of an alternative embodiment of slit width adjusting means in accordance with the invention;

FIGURES 4 and 5 are views illustrating a pleated shutter curtain embodying the invention in its closed and open positions respectively;

FIGURE 6 is a perspective view of an alternative embodiment of shutter drive in accordance with the invention; and FIGURE 7 is a perspective view of a further embodiment of the invention showing an intra-lens shutter adapted for use with larger diameter apertures.

Referring now to the drawing, and more particularly to FIGURE 1, there is shown an illustrative embodiment of a focal plane shutter assembly in accordance with the invention in which the majority of the supporting frame work for the shutter has been removed to facilitate the following explanation. The focal plane shutter assembly 10 comprises a pair of similar guide frames 12 and 14 which are mounted in spaced parallel relation. Each guide frame is substantially rectangular in shape and supports four guide rollers, such as guide rollers 16, 18, 20 and 22 rotatably mounted at the four corners of guide frame 12, and rollers 24, 26, 28 and 30 rotatably mounted at the four corners of guide frame 14.

Advantageously, each set of four guide rollers in a guide frame supports a flexible drive band made up of two closed loops fastened together at a single point. Thus, the four guide rollers of guide frame 12 have a relatively large drive band loop 32 operatively positioned therearound and a relatively smaller drive band loop 34 is operatively positioned around guide rollers 20 and 22. Drive band loops 32 and 34 preferably are fastened together at a single point to the end that the two loops may be operated simultaneously from a single source secured to the common drive band portion 33. Similarly, the four guide rollers of frame 14 have a relatively large drive band loop 36 operatively positioned therearound and a relatively smaller drive band loop 38 is operatively positioned around guide rollers 28 and 30. Drive band loops 36 and 38 are preferably fastened to each other at a single point to the end that both loops may be driven simultaneously from a single driving source secured to the common drive band portion 37.

In accordance with one embodiment of this invention, the two guide frames 12 and 14 with their associated guide rollers and drive bands are supported in a lightweight supporting frame channel of U-shaped cross section and substantially rectangular shape. A perspective view of one corner of the lightweight supporting frame channel is shown in FIGURE 2 and is generally indicated by the numeral 40. Supporting frame channel 40 is provided with a plurality of rollers such as rollers 42 and 44 rotatably secured to the wall 46 of channel 40 by screws 48 and 50, respectively. The guide frame 12 is positioned above rollers 42 and 44 and in rotatable engagement therewith, and the guide frame 14 is positioned below rollers 42 and 44 and in rotatable engagement therewith.

Guide frames 12 and 14 are restricted in their transverse movement because of the supporting frame channel 40 but they are free to move in either direction of the double arrow 52 limited only by the design of the shutter assembly. In accordance with a preferred construction of the invention, a formed lug such as lug 54 of the supporting frame channel 40 may be used to limit the longitudinal movement of the guide frames 12 and 14. It will be appreciated by those skilled in the art that other means for limiting the travel of guide frames 12 and 14 may be devised. Also, those skilled in the art will appreciate that alternative constructions for the supporting frame may be devised such as a supporting frame formed by machining a series of grooves in the castings making up the camera body. Manifestly, the supporting frame construction used with the invention will be dependent on the requirements, such as a service accessibility placed on the shutter.

As can be seen in FIGURE 1, drive band loops 32 and 34 support therebetween a transverse member 60 which advantageously may be secured to the drive band loops 32 and 34 by means of rivets 62 or the like. Drive band loop 36 has a bracket 64 secured thereto by means of rivets 66 and drive band loop 38 has a bracket 68 secured thereto, also by means of suitable rivets or the like. The pair of brackets 64 and 68 support and are secured to a second transverse member 70 which is maintained at substantially the same level and in parallel with the first transverse member 60. Advantageously, the edges of the two transverse members 60 and 70 define the slit of the shutter.

The shutter comprises two substantially identical curtains 72 and 74 which advantageously are formed in pleats from a lightweight flexible opaque material such as a polyester film. Curtain 72 is secured at one end in a suitable manner to the transverse slit edge member 60 and at its other end to the guide frame 12 along the edge indicated generally at 76. Curtain 74 is similarly secured at one end to the transverse slit edge member 70 and at the other end to the guide frame 14. The latter connection has not been shown in the drawing as parts have been broken away to illustrate the features of the invention. Also, it will be understood that in lieu of the outer ends of the pleated curtains 72 and 74 being secured to the guide frames 12 and 14, they may alternatively be secured to the supporting frame channel 40 or any other properly positioned transverse member without departing from the spirit of the invention.

Shutter curtains 72 and 74 have been illustrated out of scale in FIGURE 1 so that the other details of the focal plane shutter will not be obscured. It is clear, however, that as shown in FIGURE 2 the height of the pleated portion of each curtain may be slightly less than the open width of the supporting frame channel into which it extends to thereby provide a peripheral light lock and support for the edges of the curtains during their movement.

The details of a preferred construction for the pelated shutter curtains 72 and 74 are shown in FIGURES 4 and 5 of the drawing. In FIGURE 4 the curtain 74 is in the closed or compressed position similar to that which it would assume at one extremity of its travel. The curtain is shown in a partially open position in FIGURE 5 and in accordance with a feature of this invention the curtain in the open position comprises a double-bell shaped form. The advantage of this particular construction is that air is not trapped within the folds of the pleats when the curtain is closed rapidly. This construction represents a substantial advantage over the curtain constructions of the prior art wherein the trapping of air within the folds of the curtains have proved to be a serious hindrance to high speed operation.

The double-bell shaped form of the curtain advantageously may be achieved during the manufacture of the curtain and is a function of both the radii formed at the creases of the fold and the resistance of the curtain material to taking a permanent set. In general, for any given material, the smaller the radii the more pronounced the double-bell-shaped outline. Thus, for larger radii and small amounts of curtain extension, as shown for example in FIGURE 4, the double bell-shaped outline of the curtain is not clearly seen.

In accordance with an aspect of this invention, the fatigue life of the curtain is enhanced by a free length, sufficiently great to provide a fold angle A of less than 180° when the curtain is extended to its maximum travel position. It is desirable to maintain the fold angle at less than 180° when the curtain is fully extended and a preferred construction, as shown in FIGURE 5, limits this angle to a value as much smaller than 180° as is practical.

The energy for shutter actuation is derived, in accordance with an aspect of this invention, from the fly wheel effect of the high speed rotation of a constant speed shutter drive motor 80. The arrangement provides a significant advantage over the prior art for the use of a high speed motor rather than a spring to effect shutter operation results in a more uniform application of power to the shutter drive mechanism.

As shown in FIGURE 1, the energy of the motor 80 is transferred to the drive bands 33 and 37 to effect synchronized movement of shutter curtains 72 and 74. The shaft 82 of motor 80 has secured thereto a gear 84 and a friction drive roller 86. Gear 84 meshes with a similar gear 88 secured to shaft 90 which, in turn, is secured to second friction drive roller 92. Drive roller 92 is positioned in parallel with the drive roller 86 and rotates in an opposite direction to the end that the two drive rollers function separately to drive the shutter in a desired manner.

It will be understood that the drive mechanism shown in FIGURE 1 merely is representative of a suitable mechanism for driving the shutter from the motor 80 and that in alternative constructions idler gears may be interposed between gears 84 and 88 to achieve the desired result. The only requirement that must be met is that the two shafts 82 and 90 be contra-rotating and operating at a same speed. Further, it will be appreciated that the friction drive rollers 86 and 92 advantageously are formed of a material having a relatively high coefficient of friction with respect to the follower which they engage and to which they transfer driving power.

A pair of pressure rollers 94 and 96 are rotatably mounted in a clutch operating yoke 98 in substantial alignment with friction drive rollers 86 and 92 respectively. The yoke 98 is rockably mounted on a pivot 100 and is connected by a pivot pin 102 and a free swiveling coupling 104 to the armature 106 of a double acting solenoid 108. The double acting solenoid 108 advantageously is capable of exerting an operating force on its armature 106 in either direction along the armature axis, as indicated by the double arrow 110, when energized by current supplied over its conductors 111 and 113 from any suitable power source.

Interposed between the two pressure rollers 94 and 96, and the two friction drive rollers 86 and 92 is a transfer member 112. The transfer member 112 preferably is T-shaped with a vertical leg portion 114 adapted to be connected by means of rivets 116 and 118 to drive bands 33 and 37, respectively. Suitable guides may be provided to constrain transfer member 112 principally to movement in either direction along the path indicated by arrows 120 and 122. Movement of member 112 transverse to this direction is permitted to a slight degree with the member 112 centered in its guides by its connection to the drive bands 33 and 37. The terminal members 134 and 136 of the horizontal portion 124 of the T-shaped transfer member 112 are positioned between the friction drive rollers 86 and 92 and the pressure rollers 94 and 96. Thus by suitable operation of the rockably mounted yoke 98 in response to the energization of solenoid 108, the transfer member 112 and hence shutter curtains 72 and 74 are driven in a selected direction by the high speed motor 80.

A unique feature of the present invention becomes apparent when it is recalled that in prior art focal plane shutters, the total shutter mass must be accelerated and moved to effect the opening and closing of the photographic aperture. In sharp contrast to this prior art operation, the present invention supplies the required accelerating force to each shutter curtain in a progressive manner as one end of each curtain is always fixed and as the curtains are formed with a pleated construction. Thus, the problems of shutter kinematics normally associated with high speed operation are substantially decreased in magnitude.

With the shutter drive motor 80 operating at normal speed, and with the contra-rotating friction drive rollers 86 and 92 turning in the directions indicated by the arrows 130 and 132 respectively, the shutter is ready for operation. When a control pulse is received by the solenoid 108 from any suitable camera control circuitry, the resultant movement of its armature 106 causes the yoke 98 to be rocked on its pivot 100 to the end that either pressure roller—94 or 96—is placed into contact with the horizontal portion 124 of transfer member 112.

Assuming, for the purpose of illustration, that pressure roller 96 is placed in contact with the horizontal portion 124, then terminal member 134 of the transfer member is moved transversely in its guides until it contacts the friction drive roller 92, where it is held by the force of the solenoid as transmitted through the yoke 98 and the pressure roller 96. If desired, the yoke 98 may be provided with a detent (not shown) adapted to maintain the pressure roller 96 in contact with the horizontal portion 124 after solenoid power is removed. It will be appreciated by those skilled in the art that this detent may be of the over-center spring type, or of any other suitable type.

Since the friction drive roller 92 is rotating at high speed in the direction of arrow 130, transfer member 112, together with the drive bands 32 and 33 and the parallel slit edges 60 and 70, are driven across the format area in the direction of arrow 122. Manifestly, this driving force continues as long as terminal member 134 of transfer member 112 is in contact with the drive roller 92. It will be understood by those skilled in the art that the lengths of the two terminal members 134 and 136 of transfer member 112 may be established relative to the slit so that at substantially the time of completion of slit travel over the format area, the pressure rollers and the drive rollers are disengaged from the transfer member.

Operation of the shutter in the direction of arrow 120 is effected when the solenoid armature 106 is actuated in the direction opposite to that described above. In this event, yoke 98 is rocked about its pivot 100 to place the pressure roller 94 into contact with terminal member 136 of the horizontal portion 124 of transfer member 112. Consequently, the shutter is driven by the drive roller 86 in the direction indicated by the arrow 120. It will be understood that the control circuit means for the solenoid 108 is arranged such that each successive operation of the solenoid causes its armature 106, and hence the slit, to travel in a direction opposite to that last previously traveled.

Due to the movement imparted to the shutter during the interval in which driving power is supplied thereto, the shutter continues to travel after the driving force has terminated. In accordance with an aspect of this invention, this momentum is absorbed and the shutter is brought to rest by the spring-like action of the flexible pleated curtains 72 and 74. This action may be aided, if desired, by an auxiliary snubber (not shown) for the transfer member 112. Further, it will be appreciated that although a latch to secure the shutter in position at the end of its travel is not required, since the action of the friction drive and pressure rollers serve to maintain the shutter at the end of its travel, it is clear that, if desired, such a latch may be provided, suitably interlocked with the action of either the yoke 98 or the solenoid 108.

An alternative construction for effecting the transfer of energy from the shutter drive motor 80 to the shutter drive bands 33 and 37 is shown in FIGURE 6, wherein a transfer member 140 is used to accomplish the energy transfer in lieu of the transfer member 112 described above. Advantageously, the transfer member 140 is an endless band which is assembled over two lightweight free-wheeling pulleys 142 and 144, and which is connected to the drive bands 33 and 37 by means of rivets 146, or by any other suitable means.

In the manner described hereinabove, the shutter is ready for operation when the shutter drive motor 80, and the contra-rotating friction drive rollers 86 and 92 are operating at normal speed. Thus, when a control pulse is applied to the solenoid 108, its armature 106 is moved, as for example, in the direction of the arrow 147, to rock the yoke 98 on its pivot 100, and thereby move pressure roller 96 towards the friction drive roller 92. As the transfer member 140 is positioned between the pressure roller 96 and drive roller 92, and as the drive roller 92 is rotating at high speed, the transfer member 140 is driven in the direction of arrow 122. As a result of the connection between the transfer member 140 and the drive bands 33 and 37, the latter, together with the parallel slit edges 60 and 70, are driven in the direction of arrow 120. In the manner described above, movement of the shutter in the direction of the arrow 122 occurs when the solenoid armature 106 is actuated in the opposite direction to thereby place the pressure roller 94 and the friction drive roller 86 into contact with the transfer member 140.

Transfer member 140 is provided with a pair of openings 148 and 150 which, advantageously, are of substantially identical size and are of sufficient height and width such that either the rollers 86 and 92 or the rollers 94 and 96 may be positioned therein without contact with the member 140. Thus, whenever the transfer band 140 is driven to operate the shutter, one of the two openings 148 or 150 serves to interrupt and terminate the application of driving energy to the band. As shown in FIGURE 6, the opening 148 is used to terminate slit travel in the direction of arrow 122, and the opening 150 is used to terminate slit travel in the direction of arrow 120.

In accordance with an aspect of this invention, the openings 148 and 150 in transfer member 140 are so positioned in the transfer member with respect to the slit edges 60 and 70 that at substantially the instant of completion of slit travel over the format area, the appropriate opening causes the pressure and drive rollers to lose driving contact with the band. As with the embodiment described heretofore, a certain amount of overtravel is encountered due to the momentum imparted to the shutter and transfer member. This momentum is absorbed and the shutter brought to rest during this period of over-travel, in accordance with a feature of this invention, by the spring-like action of the pleated curtains 72 and 74. If desired, a latch to secure the shutter in position at the end of its travel may be used therewith, although it will be appreciated that such a latch is not normally required since the action of the drive and pressure rollers serves to maintain the shutter at the end of its travel.

The advantages of the transfer member drive mechanism shown in FIGURE 6 over the equivalent mechanism of FIGURE 1 are principally the achievement of a lighter weight drive assembly which results in a reduction in inertia and a reduction in overall size of the mechanism. In addition, other advantages, such as reduced requirements for precision, are attained.

It is a feature of this invention that the exposure time may be varied either by varying the slit width or by varying the speed of the drive rollers and/or the shutter drive motor. While means for varying the speed of the drive rollers or motor has not been illustrated, it will be readily understood by those skilled in the art that this speed variation may be accomplished either by known electronic controls or by suitable gear changing means.

A novel mechanism for varying slit width to effect a change in equivalent exposure time is shown in FIGURE 1, wherein a cam 152 is positioned in operative contact with the edge 154 of an extended portion 156 of the lower guide frame 14. Cam 152 is illustrated as an eccentrically mounted disc which preferably is of a shape adapted to impart uniform motion to its follower, the lower guide frame 14. Thus, it will be appreciated that rotation of eccentric cam 152 in one direction serves to move the lower guide frame 14 in the direction of arrow 122, while rotation of eccentric cam 152 in the other direction serves to move the guide frame 14 in the direction of arrow 120. Manifestly, the necessary power for movement of the lower guide frame 14 in the direction of arrow 120 may be supplied by a suitable compression spring (not illustrated).

During the movement of the lower guide frame 14 and its four guide rollers 24, 26, 28 and 30 by the eccentric cam 152, the drive band 37 associated therewith is restrained by reason of the connection of the drive band to the drive slide arm 112 and, therefore, a relative movement of the drive band 37 with respect to guide frame 14 results. As a consequence of this relative movement, the transverse slit member 70 and its pleated curtain 74 is moved relative to the transverse slit member 60, and the direction of this relative motion of the slot member 70 is dependent upon the direction of movement of guide frame 14. For example, movement of the guide frame 14 in the direction of the arrow 122 moves the transverse slit member 70 and its pleated curtain 74 to increase the width of the slit. Conversely, movement of the guide frame 14 in the direction of the arrow 120 moves the transverse slit member 70 and its pleated curtain 74 to decrease the width of the slit.

Advantageously, the eccentric cam 152 is mounted on the output shaft 160 of a gear reduction two-phase servo motor 162. As will be understood by those skilled in the art, a potentiometer 174 may be operatively connected to the shaft 160 to serve as a source of feedback signals for a conventional remote positioning control and servo system of a type well known to those skilled in the electronic arts. In this manner, eccentric cam 152 may be rotated to change the slit from a remote location, if desired.

In addition to the remotely controlled slit width mechanism described above, the slit width may be varied by manually operable apparatus at the camera, such as shown in FIGURE 3. This embodiment comprises an arm 164 having rack teeth 166 formed thereon and projecting from the upper guide frame 12, and an arm 168 having rack teeth 170 formed thereon and projecting from the lower guide frame 14. The two arms 164 and 168 are offset in a horizontal plane, and the rack teeth 166 and 170 respectively, of the two arms face one another. Interposed between arms 164 and 168, and simultaneously engaging the rack teeth of each arm, is a pinion gear 172.

Advantageously, pinion gear 172 is secured to the common output shaft 160 of servo motor 162 and potentiometer 174, the operation of which has been described hereinabove. It will be appreciated that rotation of the pinion gear 172 results in the simultaneous movement of the two guide frames 12 and 14 in opposite directions, since their rack teeth engage on opposite sides of the pinion 172. Movement of the transverse slit member 60 and its pleated curtain 72, therefore, occurs in an identical manner, but in an opposite direction, from that described hereinabove for slit member 70 and its pleated curtain 74. Consequently, for a given direction of rotation of the pinion 172, both slit members and the attached curtains move equally in opposite directions, and either increase or decrease their spacing with respect to each other to thereby increase or decrease slit width.

Manual positioning of the two guide frames 12 and 14 to effect a change in slit width may readily be accomplished by the apparatus shown in illustrative form in FIGURE 3. Thus, a miter gear 176 secured to the shaft 160 meshes with a second miter gear 178 secured to the shaft 180. Advantageously, an indicator knob 182 having an index pointer 184 thereon is secured to the shaft 180 outside of the camera case in a manually accessible position. An index scale 186 also is provided outside of the camera case in close proximity to the pointer 184 to provide a reference for pointer position to equivalent exposure time, i.e., slit width. If desired, suitable declutching means may be provided between the servo motor 162 and the shaft 160 to disengage the former from the latter when the servo system is not energized.

An intra-lens shutter embodying principles of the invention and adapted to be used with very large diameter apertures is shown in FIGURE 7 of the drawing. In this illustrative embodiment, the intra-lens shutter, indicated generally at 200 comprises a pair of similar guide frames 202 and 204 mounted in spaced parallel relation. Each guide frame is substantially rectangular in shape and supports four guide rollers, such as guide rollers 206, 208, 210 and 212 rotatably mounted at the four corners of the guide frame 202 and guide rollers 214, 216, 218 and 220 rotatably mounted at the four corners of guide frame 14.

In a manner similar to the constructions illustrated in FIGURES 1 and 6, each set of four guide rollers in a guide frame advantageously supports a flexible drive band formed of two closed loops fastened together so as to be driven from a common source. The four guide rollers of the upper guide frame 202 have a large drive band loop 222 operatively positioned therearound and a smaller drive band loop 224 is operatively positioned around guide rollers 208 and 212. Similarly, the four guide rollers of the lower frame 204 have a relatively large drive band loop 226 operatively positioned therearound and a smaller drive band loop 228 is operatively positioned around guide rollers 216 and 218.

As can be seen in FIGURE 7, drive band loops 224 and 222 support therebetween a transverse member 230 which advantageously may be secured to the drive band loops by means of the rivets 232 or the like. Drive band loops 226 and 228 support therebetween a second transverse member 234, also by means of suitable rivets or the like. The two transverse members 230 and 234 are maintained in parallel with each other so that the edges of the two transverse members serve to define the slit of the shutter.

The shutter comprises two substantially identical curtains 236 and 238 which, as described heretofore, advantageously are formed in pleats from a lightweight flexible material, such as polyester film. Shutter curtain 236 is secured at one end to the transverse member 230 and at its other end to a stationary member, such as a guide frame. Shutter curtain 238 is secured at one end to the transverse slit edge member 234 and such other end to a stationary member such as a guide frame.

The energy for shutter actuation is derived from a constantly rotating high speed motor 240. The shaft of motor 240 is connected to a gear 242 which, in turn, meshes with a gear 244. Shaft 246 of gear 244 is secured to one friction drive roller 248. Gear 244 also meshes with gear 250, the shaft 252 of which is secured to a second friction drive roller 254. It can be seen that drive rollers 248 and 254 are caused to rotate in opposite directions to the end that the shutter curtains may be driven in a selective manner.

In accordance with this illustrative embodiment of the invention, energy is transferred from the drive rollers 248 and 254 to the shutter curtains by means of a transfer band 256 assembled over a pair of free wheeling pulleys 258 and 260. A pair of pressure rollers 262 and 264 are rotatably mounted in a clutch operating yoke 266 in substantial alignment with the friction drive rollers 248 and 254 respectively. Yoke 266 is rockably mounted on a pivot 268 and is connected by a pivot pin 220 to the armature 272 of a trip solenoid 274. Yoke 266 also is connected at pivot pin 270 to one end of a return spring 276, the other end of which is securely anchored to a stationary member 278.

Drive band loop 224 for shutter curtain 236 is operatively connected to the upper portion of transfer band 256 by means of a bracket 280 and, in a similar manner, drive band loop 228 for shutter curtain 238 is operatively connected to the lower portion of transfer band 256 by suitable bracket means (not shown). Thus, it can be appreciated that when the transfer band 256 is driven by the friction drive roller 248, the two pleated curtains will open from the center of an aperture 282, and when the transfer band 256 is driven by the friction drive roller 254, the two pleated curtains will close towards the center of the aperture.

The operation of this embodiment of the invention now will be explained. The transverse slit edge members 230 and 234 of the shutter curtains, are transported by their drive bands in a manner similar to that of the shutter operation described heretofore with the exception that by driving the two bands in opposite directions, an opening and closing action of the shutter is obtained rather than merely a transport of a slit defined by the shutter curtains. The shutter is opened by applying pressure roller 262 to transfer band 256 to place the latter in contact with friction drive roller 248. The transfer band 256 is driven in this fashion until an opening 284 in the transfer band comes under the friction drive roller 248 to thereby remove the driving force of the latter. Similarly, the shutter is closed by applying pressure roller 264 to transfer band 256 to place the latter in contact with the opposite rotating friction drive roller 254 until the opening 286 in transfer band 256 comes under the friction drive roller 254.

Advantageously, the time during which the shutter is opened may be controlled by applying a signal pulse to energize the trip solenoid 274. The energization of solenoid 274 actuates the yoke 266 through the movement of its armature 272 to rock friction drive roller 262 into contact with the transfer band 256, thereby causing the shutter to open. The shutter remains open for the length of time that the solenoid 274 is energized. When the solenoid is de-energized, the return spring 276 connected to the yoke 266 rocks the yoke in the opposite direction to place friction drive roller 264 in contact with transfer band 256, thereby causing the shutter to be closed.

It will be appreciated by those skilled in the art that the above described shutter mechanism may alternatively be driven by replacing the drive belt and friction drive mechanisms with a pneumatic cylinder. In such an embodiment, the piston rod of a pneumatic cylinder would be connected to the drive bands in a manner similar to the connection of the transfer band. Then by suitable control valves the pneumatic cylinder would directly drive the shutter.

It further will be appreciated by those skilled in the art that the advantages of the shutter construction shown in FIGURE 7 and described above are manifold. Thus, this novel shutter construction provides rapid opening and closing due to low inertia and few moving parts, large apertures may be used without unduly encumbering the shutter, improved lens performance is attained due to the absence of shock and vibration, no lubrication is required for the intra-lens parts, and further the shutter may be economically constructed due to the relatively few high precision parts required.

It will be understood by those skilled in the art that changes may be made in construction and arrangement of the parts of the illustrative embodiments of the focal plane shutter assembly disclosed herein without departing from the real spirit and scope of this invention, and that it is intended to cover by the appended claims any modified forms of structure or use of equivalents which may reasonably be included within their scope.

What is claimed is:

1. An improved high speed focal plane shutter comprising in combination a pair of pleated expansible shutter curtains, adapted to be transported across the exposure area of a photographic camera, a first transverse member secured to an edge of one shutter curtain, a second transverse member secured to an edge of the other shutter curtain, said first and second transverse members defining a slit therebetween, a constant speed driving motor, and selectively actuatable linking means including contra-rotating friction drive roller means, drive band means, and selectively operable clutch means for selectively engaging said drive band means with either one of said friction drive roller means for coupling said driving motor to said pair of pleated expansible shutter curtains for causing each of said curtains to be driven across the exposure area at a constant speed and in a desired direction.

2. An improved high speed photographic shutter comprising in combination a pair of pleated expansible shutter curtains, adapted to be transported across the exposure area of a photographic camera to permit the passage of light, a constant speed driving motor, and selectively actuatable linking means coupling said driving motor to said pair of pleated expansible shutter curtains for causing each of said curtains to be driven across said exposure area at a constant speed, said selectively actuatable linking means comprising contra-rotating friction drive roller means, low inertia coupling means and clutch means for selectively engaging one of said friction driving roller means with said low inertia coupling means to cause said shutter curtains to be driven in a given direction for one operation and in the opposite direction for the next subsequent operation.

3. An improved high speed photographic shutter comprising in combination a pair of pleated expansible shutter curtains, adapted to be transported across the exposure area of a photographic camera to permit the passage of light, a constant speed driving motor, and selectively actuatable linking means coupling said driving motor to said pair of pleated expansible shutter curtains for causing each of said curtains to be driven across said exposure area at a constant speed, said selectively actuatable linking means comprising a first friction drive roller coupled to said motor for clockwise rotation, a second friction drive roller coupled to said motor for counter-clockwise rotation and clutch means for selectively coupling said first friction drive roller to said pleated expansible shutter curtains for driving said curtains in a given direction or for selectively coupling said second friction drive roller to said pleated expansible shutter curtains for driving said curtains in an opposite direction.

4. An improved high speed photographic shutter, in accordance with claim 3 wherein said clutch means comprises a yoke member, a pair of pressure rollers each rotatably mounted on different arms of said yoke member and actuatable means for rocking said yoke to selectively position either of said pressure rollers in operative association with one of said friction drive rollers.

5. An improved high speed focal plane shutter comprising in combination a pair of pleated expansible shutter curtains, adapted to be transported across the exposure area of a photographic camera, a drive band secured to each of said pleated expansible shutter curtains such that movement of each drive band causes its shutter curtain to be transported, a constant speed driving motor, and selectively actuatable linking means comprising a first and a second friction drive roller contra-rotating with respect to each other for coupling said driving motor to each of said drive bands, said first friction drive roller being adapted to cause said curtains to be simultaneously transported across the exposure area at a constant speed in a given direction, said second friction drive roller being adapted to cause said curtains to be simultaneously transported across the exposure area at a constant speed in an opposite direction.

6. An improved high speed focal plane shutter in accordance with claim 5 wherein said selectively actuatable linking means further comprises a transfer member in operative contact with each of said drive bands, and clutch means for causing either of said friction drive rollers to be operatively engaged with said transfer member for driving said drive bands and said shutter curtains.

7. An improved high speed focal plane shutter in accordance with claim 6 wherein said selectively actuatable linking means further comprises a solenoid having an armature, and pivot means connecting said clutch means to said armature for enabling said clutch means to be controlled by the energized and de-energized condition of said solenoid.

8. An improved high speed focal plane shutter in accordance with claim 6 wherein said transfer member is formed with terminal members at predetermined positions to limit the travel of said shutter curtains to a desired distance.

9. An improved high speed focal plane shutter in accordance with claim 6 wherein said transfer member comprises a substantially T-shaped member having a first leg positioned perpendicular to a second leg, fastening means securing said first leg to each of said drive bands, said second leg being adapted to be placed into driven engagement with either one of said friction drive rollers by the operation of said clutch means.

10. An improved high speed focal plane shutter in accordance with claim 6 wherein said transfer member comprises a pair of freely rotatable spaced-apart pulleys and an endless band positioned around said pulleys to define a pair of elongated sides, one side of said endless band being in energy transferring contact with said pair of drive bands and the other side of said endless band being adapted to be placed in driven engagement with either one of said friction drive rollers by the operation of said clutch means.

11. A high speed focal plane shutter for a camera comprising the combination of a pair of guide frames mounted in spaced parallel relation, a first expansible shutter curtain of pleated material movably supported in one guide frame, a second expansible shutter curtain of pleated material movably supported in the other guide frame, a transverse member connected to one edge of each shutter curtain, the transverse members defining a slit therebetween, a drive band connected to each transverse member, a constant speed drive motor, selectively actuatable coupling means comprising a first and a second friction drive roller contra-rotating with respect to each other and connected between said drive motor and the drive band of each shutter curtain for causing said transverse members to be driven in synchronism and at constant speed in a given direction across the exposure area of the camera, said first friction drive roller being adapted to drive said transverse members and each of said shutter curtains in one direction and said second friction drive roller being adapted to drive said transverse members and each of said shutter curtains in the opposite direction, both of said friction drive rollers being alternately employed, and means for varying the relative positions of said guide frames to thereby vary the size of the slit defined by said transverse members.

12. A high speed focal plane shutter for a camera comprising the combination of a pair of guide frames mounted in spaced parallel relation, a first expansible shutter curtain of pleated material movably supported in one guide frame, a second expansible shutter curtain of pleated material movably supported in the other guide frame, a transverse member connected to one edge of each shutter curtain, said transverse members defining a slit therebetween, a drive band connected to each transverse member, a constant speed drive motor, selectively actuatable coupling means comprising a first and second friction drive roller contra-rotating with respect to each other and connected between said drive motor and the drive band of each shutter curtain for causing said transverse members to be driven in synchronism and at constant speed in a given direction across the exposure area of the camera, said first friction drive roller being adapted to drive said transverse members and each of said shutter curtains in one direction and said second friction drive roller being adapted to drive said transverse members and each of said shutter curtains in the opposite direction, each of said friction drive rollers being alternately employed and cam means in operative contact with one edge of one of said guide frames for enabling the position of the latter to be shifted relative to the other guide frame for varying the size of the slit defined by said transverse members.

13. A high speed focal plane shutter for a camera in accordance with claim 12 further comprising a servo receiver coupled to said cam means for enabling the operation of said cam means to be controlled at a remote location.

14. A high speed focal plane shutter for a camera comprising the combination of a pair of guide frames mounted in spaced parallel relation, a first expansible shutter curtain of pleated material movably supported in one guide frame, a second expansible shutter curtain of pleated material movably supported in the other guide frame, a transverse member connected to one edge of each shutter curtain, said transverse members defining a slit therebetween, a drive band connected to each transverse member, a constant speed drive motor, selectively actuatable coupling means comprising a first and a second friction drive roller contra-rotating with respect to each other and connected between said drive motor and the drive band of each shutter curtain for causing said transverse members to be driven in synchronism and at constant speed in a given direction across the exposure area of the camera, said first friction drive roller being adapted to drive said shutter in one direction and said second friction drive roller being adapted to drive said shutter in an opposite direction, each of said friction drive rollers being alternately employed, an elongated member having rack teeth formed therein extending from each of said guide frames in spaced parallel relation and a pinion operatively engaging said rack teeth and adapted when rotated to shift the positions of said guide frames relative to each other to thereby vary the size of the slit defined by said transverse members.

15. A high speed focal plane shutter for a camera in accordance with claim 14 further comprising means remotely positioned from said pinion for controlling the rotation thereof, said means comprising a manually actuatable control knob and elongated shaft means coupling said control knob to said pinion.

16. A high speed intra-lens shutter for a camera comprising the combination of a pair of guide frames mounted in spaced parallel relation, a first expansible shutter curtain of pleated material movably supported in one guide frame, a second expansible shutter curtain of pleated material movably supported in the other guide frame, a transverse member connected to one edge of each shutter curtain, a drive band connected to each transverse member, shutter drive means and selectively actuatable coupling means comprising a first and a second friction drive roller contra-rotating with respect to each other and connected between said shutter drive means and the drive band of each shutter curtain said first friction drive roller being actuated to cause said transverse members to be driven in opposite directions away from the center of said guide frames to effect opening of said shutter and said second friction drive roller being actuated to cause said transverse members to be driven in opposite directions towards the center of said guide frames to effect closing of the shutter.

17. A high speed intra-lens shutter for a camera in accordance with claim 16 wherein said shutter drive means comprises a constant speed motor.

18. A high speed intra-lens shutter for a camera in accordance with claim 17, wherein said selectively actuatable coupling means includes a transfer member in operative contact with each of said drive bands pivotable yoke means having a pair of spaced rollers, a solenoid relay coupled to said yoke means for placing one of said spaced rollers in operative association with said transfer member and one of said shutter drive rollers for opening said shutter and resilient spring means coupled to said yoke means for placing the other spaced roller in operative association with said transfer member the other shutter drive roller for closing said shutter.

19. A high speed intra-lens shutter for a camera in accordance with claim 18, wherein said transfer member comprises a pair of freely rotatable spaced-apart pulleys and an endless band positioned around said pulleys to define a pair of elongated sides, bracket means fastening one side of said endless band to one of said drive bands for causing said first expansible shutter curtain to be transported in a given direction, and bracket means fastening the other side of said endless band to the other of said drive bands for causing said second expansible shutter curtain to be transported in a direction opposite that of said first expansible shutter curtain.

References Cited in the file of this patent

UNITED STATES PATENTS

| 1,764,066 | Chamberlin | June 17, 1930 |
| 2,877,698 | Beach | Mar. 17, 1959 |

FOREIGN PATENTS

| 14,839 | Great Britain | 1893 |